United States Patent Office 3,273,993
Patented Sept. 20, 1966

3,273,993
PROCESS OF REDUCTION ROASTING OF IRON ORE WITH METALLIC IRON
Norwood B. Melcher, Minneapolis, Minn., assignor to the United States of America as represented by the Secretary of the Interior
No Drawing. Filed Jan. 30, 1964, Ser. No. 341,462
15 Claims. (Cl. 75—1)

The invention herein described and claimed may be used by or for the Government of the United States of America for governmental purposes without the payment of royalties thereon or therefor.

The invention relates to processing off-grade iron ores to produce iron-bearing material suitable for use in blast furnaces or other iron-making devices.

The United States has vast reserves of submarginal iron ores that are not usable by conventional processing. Reduction roasting processes have been proposed as means for converting such ores to usable products. These processes are based on the principle of conversion of non-magnetic ores (of the formula $Fe_2O_3$) to the magnetic type (having the formula $Fe_3O_4$) by partial deoxidation. However such processes, which conventionally employ reducing gases such as hydrogen, carbon monoxide, etc., have often resulted in contaminated products as well as being costly.

It is accordingly an object of the present invention to provide a convenient and economical process for upgrading iron ores.

It is a further object of the invention to provide a method for converting non-magnetic iron ores to the magnetic variety.

It has now been found that the above objectives may be accomplished by means of reduction of the ore with metallic iron. The reduction is accomplished by simply mixing the iron ore with metallic iron and subjecting the mixture to elevated temperature.

Any type of metallic iron may be used; however, the preferred reductant is scrap iron because of its obvious economic advantages. The United States has large supplies of ferrous scrap such as turnings, borings, etc., that because of their physical dimensions are poorly suited for steelmaking. Such scrap, which has a relatively high specific surface has been found very suitable for the process of the invention.

Proportions of the ore and metallic iron reductant are not critical and optimum amounts will vary with the type of ore, type of metallic iron, particle size of ore, temperature, etc. Although a ratio of ore to iron (scrap) of about 2 to 1 generally gives very good results, optimum proportions are best determined experimentally. Ratios of ore to scrap of from about 2 to 1 to about 20 to 1 are generally satisfactory.

Optimum temperature of the reduction will also vary with the factors listed above; however, temperatures of about 600° C. to 1100° C. are generally satisfactory. A temperature of about 800° C. has been found very satisfactory as indicated in the examples that follow.

Although the reduction may be carried out in an inert atmosphere, it has been found that conversion of the non-magnetic ore to the magnetic form is improved and accelerated when the reduction takes place in an atmosphere of $CO_2$ or $H_2O$ or a mixture of the two. This atmosphere is advantageously derived in a continuous process from burning carbon or a hydrocarbon fuel to form the $CO_2$ and $H_2O$ as combustion products; this combustion also provides the required temperature for reduction of the non-magnetic ore. Such a process may be carried out in any suitable furnace such as a rotary kiln or shaft furnace.

Some of the reactions which may result from this atmosphere are as follows:

(1) $Fe + \frac{1}{2}O_2 = FeO$
(2) $Fe + CO_2$ (from hydrocarbon or carbon-flame combustion) $= CO + FeO$
(3) $Fe + H_2O$ (from hydrocarbon flame combustion) $= H_2 + FeO$
(4) $FeO + Fe_2O_3 = Fe_3O_4$
(5) $Fe_2O_3 + \frac{1}{3}H_2$ (from reaction 3) $= \frac{2}{3}Fe_3O_4 + \frac{1}{3}H_2O$
(6) $Fe_2O_3 + \frac{1}{3}C$ (from reaction 2) $= \frac{2}{3}Fe_3O_4 + \frac{1}{3}CO_2$ The following examples will serve to more specifically illustrate the invention.

EXAMPLE 1

The apparatus employed in this example (as well as in Examples 3 and 4) was a laboratory roasting apparatus consisting of an electrically heated rotating drum retort provided with inlet and outlet for gases to provide the desired atmosphere for the reduction. These gases were obtained from cylinders of helium or $CO_2$ or a steam generator, as required.

Non-magnetic iron ore (30.0 percent Fe), crushed to minus ⅜-inch, was charged to the roasting apparatus with degreased steel borings (98 percent Fe). The ratio of ore to scrap was 200 grams/30 grams. A generous stream of helium was piped into the roaster which was gradually heated to 800° C., held there for 30 minutes and then cooled to ambient temperature. Helium continued to flow until the contents were discharged. The partially altered scrap was removed by selective dry magnetic separation; the ore was ground to minus 325-mesh and separated in a Davis magnetic tube. Table 1 gives a materials balance of the products.

Table 1

| Product | Weight, grams | Analysis, percent Fe |
|---|---|---|
| Borings | 32.5 | 86.6 |
| Ore, Magnetic | 35.0 | 66.7 |
| Ore, Non-magnetic | 155.2 | 21.9 |

It will be noted that 41 percent of the iron units in the ore were rendered magnetic in the experiment.

EXAMPLE 2

In this example, ore and scrap in the same ratio as in Example 1 were charged to a clay crucible, sealed to exclude atmospheric gases, and heated in a muffle furnace for 30 minutes at 800° C. Table 2 gives a materials balance of the products.

Table 2

| Product | Weight, grams | Analysis, percent Fe |
|---|---|---|
| Borings | 36.0 | 81.2 |
| Ore, Magnetic | 20.6 | 65.3 |
| Ore, Non-magnetic | 169.8 | 24.3 |

In this case, 24.5 percent of the iron units in the ore had been converted to magnetite. The lower recovery was due to poorer scrap-ore contact in the crucible.

EXAMPLE 3

In this example a series of tests were run with the reduction carried out in a gaseous atmosphere of $CO_2$ or $H_2O$ or a mixture of the two. The apparatus was the same as that used in Example 1. 200 grams of ore comprised of −⅜-inch +10-mesh lump, plus pelletized fines in the range −⅜-inch +10-mesh were employed in each test. The scrap used was mild steel lathe turnings 0.009 inch thick, 0.061 inch wide, with a surface area of approximately 1500 sq. in./lb. The ore (original sample) was a marginal, non-magnetic, earthy, essentially hematitic ore. Other conditions and results are given in Table 3.

*Table 3.—Results of reduction roasting tests*

| Test No. | Concentrate Analyses | | | Weight Recovery of Ore [1] | Iron Recovery [2] | Conditions | | |
|---|---|---|---|---|---|---|---|---|
| | Fe | $SiO_2$ | $Al_2O_3$ | | | Temp., °C. | Gas | Ratio, Ore:Scrap |
| Orig. sample | 57.89 | 10.41 | 3.19 | | | | | |
| 1 | 63.70 | 5.63 | 2.41 | 89.9 | 94.0 | 1,000 | $H_2O$ | 2:1 |
| 2 | 65.52 | 4.88 | 2.55 | 93.8 | 95.0 | 800 | $H_2O$ | 2:1 |
| 3 | 63.28 | 5.16 | 2.72 | 89.4 | 92.0 | 800 | $H_2O$ | 3:1 |
| 4 | 63.70 | 5.56 | 1.61 | 84.6 | 87.5 | 800 | $H_2O$ | 4:1 |
| 5 | 64.52 | 6.20 | 2.34 | 95.0 | 96.8 | 800 | $CO_2$ | 2:1 |
| 6 | 64.75 | 5.40 | 2.46 | 90.4 | 92.3 | 800 | $CO_2$ | 3:1 |
| 7 | 64.98 | 4.66 | 2.20 | 82.4 | 85.2 | 800 | $CO_2$ | 4:1 |
| 8 | 66.57 | 4.42 | 2.34 | 74.0 | 77.5 | 800 | $CO_2$ | 5:1 |
| 9 | 64.29 | 5.86 | 2.07 | 94.8 | 97.4 | 800 | $H_2O+CO_2$ | 2:1 |

[1] Percent of ore recovered by magnetic separation.
[2] Percent of total iron content converted from non-magnetic to magnetic state.

EXAMPLE 4

Reaction conditions in this example were similar to those of Example 3 except that the original sample (ore prior to reduction roasting) consisted of a low-grade non-magnetic taconite. Results are given in Table 4.

*Table 4*

| Test No. | Concentrate Analyses | | | Weight Recovery of Ore, percent | Iron Recovery, percent | Conditions | | |
|---|---|---|---|---|---|---|---|---|
| | Fe | $SiO_2$ | $Al_2O_3$ | | | Temp., °C. | Gas | Ratio, Ore:Scrap |
| Orig. Sample | 31.7 | 52.5 | Negligible | | | | | |
| 1 | 61.1 | 14.7 | do | 51.3 | 96.0 | 800 | $H_2O+CO_2$ | 2:1 |

What is claimed is:

1. A method for reduction of non-magnetic iron ore comprising mixing said ore with metallic iron-containing material and heating said mixture to elevated temperature in an atmosphere selected from the group consisting of $CO_2$ gas, water vapor, and a mixture of $CO_2$ gas and water vapor to effect a reaction in which said ore is reduced at least in part to magnetic iron oxide.

2. The method of claim 1 in which the ore is a low-grade, marginal ore.

3. The method of claim 2 in which the ore is taconite.

4. The method of claim 1 in which the metallic iron-containing material comprises ferrous scrap.

5. The method of claim 1 in which the temperature is from about 600° C. to about 1100° C.

6. The method of claim 5 in which the temperature is about 800° C.

7. The method of claim 1 in which the ratio of ore to metallic iron-containing material is from about 2 to 1 to about 20 to 1.

8. The method of claim 1 in which the ratio of ore to metallic iron-containing material is about 2 to 1.

9. The method of claim 1 in which the magnetic iron oxide product is separated by means of magnetic separation.

10. The method of claim 1 in which the reduction is carried out in an atmosphere of $CO_2$ gas.

11. The method of claim 1 in which the reduction is carried out in an atmosphere of water vapor.

12. The method of claim 1 in which the reduction is carried out in an atmosphere comprising a mixture of $CO_2$ gas and water vapor.

13. The method of claim 12 in which the $CO_2$ and water vapor are derived from combustion of a carbonaceous fuel material.

14. The method of claim 13 in which the carbonaceous fuel is natural gas.

15. The method of claim 13 in which the heat for the reduction reaction is also derived from the combustion of the carbonaceous fuel material.

References Cited by the Examiner

UNITED STATES PATENTS

| 1,001,536 | 8/1911 | Lilja. | |
| 2,523,138 | 9/1950 | Oppegaard | 75—36 |
| 2,648,600 | 8/1953 | Reeve | 75—7 |
| 2,944,884 | 7/1960 | Halvorson | 75—1 |
| 3,097,156 | 7/1963 | Johnson et al. | 75—1 |

FOREIGN PATENTS 624,785   8/1961   Canada.

OTHER REFERENCES

Mellor: Comprehensive Treatise on Inorganic and Theoretical Chemistry, vol. 13, Fe (part 2), p. 737.

BENJAMIN HENKIN, *Primary Examiner.*

DAVID L. RECK, *Examiner.*

UNITED STATES PATENT OFFICE
CERTIFICATE OF CORRECTION

Patent No. 3,273,993                                            September 20, 1966

Norwood B. Melcher

It is hereby certified that error appears in the above numbered patent requiring correction and that the said Letters Patent should read as corrected below.

Column 2, line 10, for that portion of equation 6 reading "$Fe_2O_3 + 1/3C$" read -- $Fe_2O_3 + 1/3CO$ --.

Signed and sealed this 22nd day of August 1967.

(SEAL)
Attest:

ERNEST W. SWIDER                                              EDWARD J. BRENNER
Attesting Officer                                                   Commissioner of Patents